US005695204A

United States Patent [19]

Ford

[11] Patent Number: 5,695,204
[45] Date of Patent: Dec. 9, 1997

[54] HITCH ADAPTER WITH PROTECTIVE DEVICE

[76] Inventor: Billy Clyde Ford, 10511 NE. 215th Ct., Vancouver, Wash. 98682

[21] Appl. No.: 583,466

[22] Filed: Jan. 5, 1996

[51] Int. Cl.⁶ .................................................. B60D 1/60
[52] U.S. Cl. ................................ 280/507; 280/767
[58] Field of Search ............................... 280/507, 767, 280/511, 491.2, 491.5, 475

[56] References Cited

U.S. PATENT DOCUMENTS

| | | | |
|---|---|---|---|
| 3,271,050 | 9/1966 | Saunders | 280/507 |
| 3,889,981 | 6/1975 | Westford | 280/507 |
| 4,266,799 | 5/1981 | Wood | 280/490.1 |
| 5,000,067 | 3/1991 | Kolbusz et al. | 280/507 X |
| 5,184,840 | 2/1993 | Edwards | 280/507 |

*Primary Examiner*—Brian L. Johnson
*Assistant Examiner*—Victor E. Johnson
*Attorney, Agent, or Firm*—Robert L. Harrington

[57] ABSTRACT

A hitch adapter with integral protective device that is suited for mounting to a conventional sleeve-type hitch. The protective device protects the hitch adapter from damage due to impacts with a ground surface. Depending brackets are fixedly attached to the hitch adapter, the brackets supporting the integral protective device. The periphery of the protective device is offset from the axis of the sleeve which is insertable into a socket of the sleeve-type hitch. A roller is mounted to the depending bracket to provide a contact member that will contact the surface of the ground and prevent the balance of the hitch from coming into contact with the ground. Alternatively, a skid plate is mounted on the dependent bracket to provide a contact member for protecting the hitch adapter.

4 Claims, 1 Drawing Sheet

HITCH ADAPTER WITH PROTECTIVE DEVICE

FIELD OF THE INVENTION

This invention relates to sleeve-type hitches for vehicles and more particularly to a hitch adapter with integral protective device removably mountable to the sleeve-type hitch.

BACKGROUND OF THE INVENTION

Hitches are added to vehicles such as automobiles and pickups and the like to facilitate towing another vehicle. Typically the hitch will enable a user to tow another motorized vehicle or a variety of trailers such as boat, recreational or utility trailers.

A popular and well known hitch arrangement for a vehicle is the receiver-type hitch. The receiver-type hitch is mounted to the frame of the vehicle and has a socket that is arranged to receive various hitch adapters. The hitch adapters are removably installed in the socket of the receiver-type hitch and are generally retained in position by a retention pin. The hitch adapter serves to extend the hitch beyond the rear of the vehicle and typically carries a connecting member such as a ball for attaching the towed vehicle hitch to the hitch adapter.

The frame of many vehicles, such as four-wheel drive pickups and the like, have their frames elevated above the ground surface to such a height that an offset hitch adapter is required to place the connecting ball at an elevation suited for the hitch of the towed vehicle. The offset hitch adapter in effect lowers the point of attachment of the hitch of the towing vehicle to the hitch of the towed vehicle.

As is common with hitches attached to vehicles, it is possible for the bottom of the hitch to impact and rub on the ground surface when the towed and towing vehicles encounter an incline with respect to the roadway. This is, of course, to be avoided since the rubbing of the hitch on the ground surface is likely to damage the bottom of the hitch adapter and/or the hitch of the towed vehicle. The connecting ball when mounted to the hitch adapter, of course, becomes a part of the hitch adapter and the stud and nut that mounts the ball to the hitch adapter extends below the bottom surface of the hitch adapter and is subject to damage when the hitch adapter bottoms out.

Hitch protectors have been developed for the hitch adapters that extend outwardly from the socket on the same plane. An example is the commonly owned U.S. Pat. No. 5,184,840. These protective devices either have a roller or a skid plate mounted to a bracket which is attached to the socket of the vehicle hitch, typically by the hitch adapter retention pin. The bracket is arranged to extend downwardly so that the roller or skid plate will contact the ground surface and prevent the hitch adapter or towed vehicle hitch from contacting the ground surface. These type of protective devices are ineffective for the offset hitch adapters since the roller or skid plate are not arranged to extend below the bottom surface of the offset hitch adapter.

BRIEF SUMMARY OF THE INVENTION

A preferred embodiment of the present invention is an offset hitch adapter that has a hitch protective device integrally mounted to the hitch adapter. A frame member (bracket) is fixedly mounted to the offset hitch adapter and is arranged to support a roller with the bottom periphery of the roller being at a plane lower than the bottom surface of the hitch adapter and/or the ball and stud mounted thereon. Alternatively a skid plate is mounted to the frame member with the skid plate being at a plane lower than the bottom surface of the hitch adapter and/or the ball and stud mounted thereon. The offset hitch adapter is therefore protected from impact with the ground surface without the addition of added accessory items or other hitch protective devices.

DESCRIPTION OF THE PREFERRED EMBODIMENT

Figure 1:
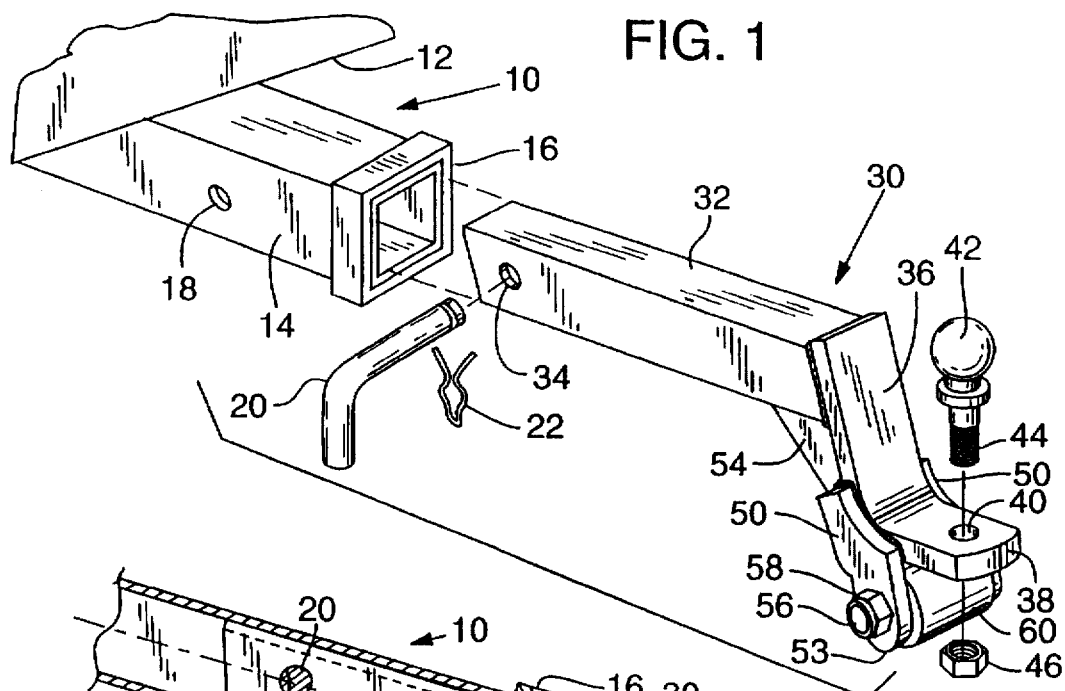
FIG. 1 is a perspective view of the offset hitch adapter of the present invention installed on a receiver-type hitch.

FIG. 1 illustrates a receiver-type hitch 10 mounted to the rear of a vehicle 12. The receiver-type hitch 10 is mounted to the frame of the vehicle 12 in a conventional manner and only the socket portion 14 of the hitch 10 is shown in relation to a rear portion of the vehicle 12. The receiver-type hitch 10 has a socket 14 that is arranged to receive various hitch adapters. Typically the socket 14 is square in section and is of tubular construction. A reinforcing collar 16 surrounds the end of the socket 14 and provides additional structural integrity. Apertures 18 are provided in the side walls of the socket 14 to receive a retention pin 20. Each of the hitch adapters mountable in the socket 14 will have apertures in their side walls that will be alignable with the apertures 18 to permit the installation of a retention pin 20 to thus secure the hitch adapter to the receiver-type hitch 10. The retention pin 20 is typically secured in the aligned apertures of the socket 14 and the hitch adapter by a retention pin clip 22.

An offset hitch adapter 30 is illustrated in FIG. 1 and is arranged to be mounted to the socket 14 of the receiver hitch 10. A tubular portion 32 of the adapter 30 is sized and configured to fit into the interior of the socket 14. Apertures 34 in the side wall of the tubular portion 32 are alignable with the apertures 18 of the socket 14. The tubular portion 32 is inserted into the socket 14 until the apertures 34 are aligned with the apertures 18 of the socket 14 and the tubular portion 32 is retained in the socket 14 by the insertion of the pin 20 into the aligned apertures 18 and 34. The clip 22 is affixed to the end of the pin 20 to secure the pin 20 in the aligned apertures 18, 34.

Figure 2:
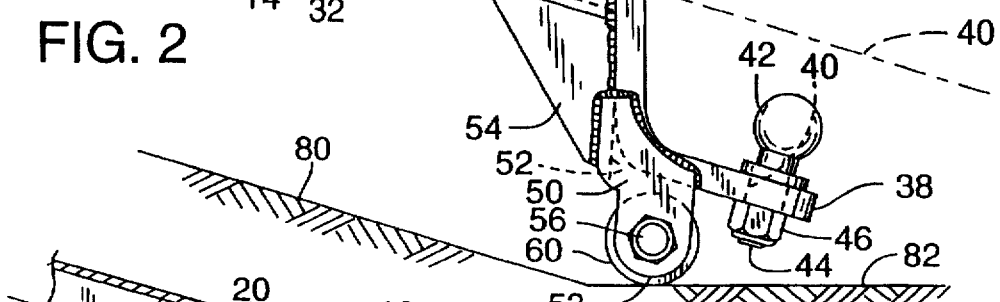
FIG. 2 is a perspective view of the offset hitch protector of the present invention.

An L-shaped draw bar 36 is fixedly attached to the tubular portion 32. As best seen in FIG. 2, a leg 38 of the draw bar 36 is offset from the longitudinal axis 40 of the tubular portion 32 and thus the leg 38 will be offset from the axis of the socket 14 when the adapter 30 is mounted in the socket 14. A bore 40 is provided in the leg 38 to facilitate attaching a hitch or pole of a towed vehicle to the hitch adapter 30. Typically a ball 42 is mounted in the bore 40 of the leg 38 and the draw bar 36 to facilitate connecting the hitch adapter 30 to a ball-type hitch of a towed vehicle. The ball 42 has a stud 44 that will fit in the bore 40 and the ball and stud are secured to the leg 38 by a nut 46. Depending brackets 50 are mounted on each side of the draw bar 36 as by welding. The base 53 of the depending brackets 50 are offset in the same direction from the longitudinal axis 40 a distance greater than the leg 38 is offset from the longitudinal axis 40. For added rigidity, an extender plate 52 extends between the brackets 50 and is fixedly attached to each of the brackets 50 as by welding. The extender plate is additionally secured to the draw bar 36 by welding. A triangular-shaped plate 54 is fitted to the underside of the tubular portion 32 and a side of the draw bar 36 and the extender plate 52. The triangular plate 54 is secured in position as by welding. The triangular plate 54 adds structural integrity to the offset hitch adapter 30. Each of the brackets 50 is bored to receive a supporting stud 56. A contact member, such as a roller 60 is rotatably mounted on the stud 56 between the brackets 50. The stud 56 is secured in position by a nut 58. The periphery of the roller 60 when mounted between the brackets 50 on the stud 56 projects beyond the base 53 of the depending brackets 50.

Figure 3:
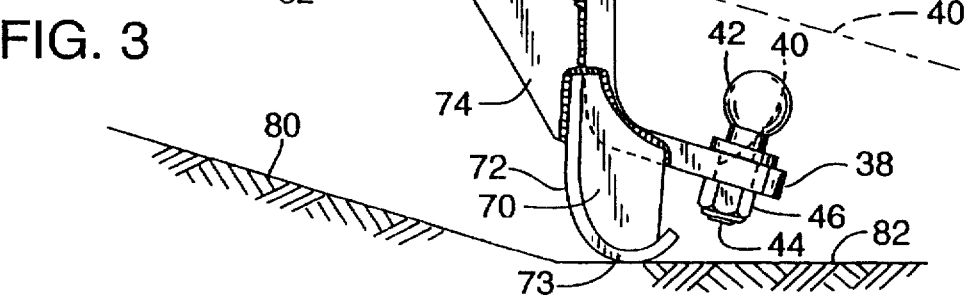
FIG. 3 is an alternate embodiment of an offset hitch protector of the present invention.

FIG. 3 illustrates an alternate embodiment of a hitch adapter of the present invention. The hitch adapter 30' is constructed in the same manner as the hitch adapter 30 of FIGS. 1 and 2. The hitch adapter 30' has a tubular portion 32 that is configured to fit into the socket 14 of the receiver-type hitch 10. The tubular portion 32 has bores 34 in each of its side walls aligned one with the other. An L-shaped draw bar 36 is fixedly attached to the tubular portion 32 as by welding. A leg 38 of the draw bar 36 is offset from the axis 40 of the tubular portion 32 in the same manner as the leg 38 of the hitch adapter 30 of FIGS. 1 and 2. Depending brackets 70 are fixedly attached to each side of the draw bar 36 in close proximity to the leg 38. The depending brackets 70 are curved and a curve wear plate 72 extends between the depending brackets 70 and is fixedly attached to the depending brackets 70 and the draw bar 36. A triangular plate 74 is fixedly attached to the underside of the rear portion 32, to the draw bar 36 and to the wear plate 72. The wear plate 72 is curved so that when it comes into contact with an object such as the ground it will not gouge into the surface.

FIGS. 2 and 3 illustrate the conditions when the hitch adapter 30 and 30' bottom out or contact the road surface when the towed vehicle 12 engages an incline 80 that is at an angle to the general road surface 82. FIG. 2 shows that the roller 60 will come into contact with the surface and thus prevent the stud 44 and the nut 46 which extend below the leg 38 to come into contact with the ground surface. Similarly, the wear plate 72 as shown in FIG. 3 will come into contact with the surface and thus prevent the stud 44 from contacting the ground surface. The wear plate 72 will simply slide along on the surface of the ground as it comes into contact with the ground surface.

Those skilled in the art will recognize that modifications and variations may be made without departing from the true spirit and scope of the invention. The invention is therefore not to be determined by the embodiments described and illustrated but is to be determined by the appended claims.

What is claimed is:

1. A hitch adapter with protective device for a hitch which includes a socket configured to receive the hitch adapter, comprising:

a tubular portion having a longitudinal axis removably mountable in a socket of said hitch;

a draw bar configured to have a portion extending downwardly from the tubular portion and defining a lowest point of the draw bar, said draw bar provided with a connecting member positioned on said draw bar portion and below the axis of the tubular portion;

a depending bracket fixedly attached to one of the tubular portion and the draw bar; and a contact portion provided on the depending bracket as the lowest point of the depending bracket and below the lowest point of the draw bar.

2. A hitch adapter as defined in claim 1 wherein:

the draw bar is L-shaped having a lower leg whereat the connecting member is positioned, said bracket configured for attachment to the tubular portion and the draw bar, and said contact portion comprising a separate contact member secured to the depending bracket.

3. A hitch adapter as defined in claim 2 wherein:

the contact member is a roller rotatably mounted to the depending bracket.

4. A hitch adapter as defined in claim 2 wherein:

the contact member is a skid plate mounted to the depending bracket.

* * * * *